United States Patent [19]

Lecluse

[11] 4,191,914

[45] Mar. 4, 1980

[54] CONTROL CIRCUIT FOR A DC ELECTRIC MOTOR PARTICULARLY USED IN THE PROPULSION OF AN ELECTRIC VEHICLE

[75] Inventor: Jean-François Lecluse, Douvres, France

[73] Assignee: Agence Nationale de Valorisation de la Recherche (ANVAR), Neuilly-sur-Seine, France

[21] Appl. No.: 903,795

[22] Filed: May 8, 1978

[30] Foreign Application Priority Data

May 12, 1977 [FR] France .............................. 77 14573

[51] Int. Cl.² .............................................. H02P 7/14
[52] U.S. Cl. ................................... 318/139; 318/338; 318/493
[58] Field of Search ................. 318/139, 338, 405, 493

[56] References Cited

U.S. PATENT DOCUMENTS

| 3,866,098 | 2/1975 | Weiser ................................... 318/251 |
| 3,950,684 | 4/1976 | Peterson ............................... 318/338 |
| 3,969,660 | 7/1976 | Ruppert ................................ 318/338 |
| 3,989,990 | 11/1976 | Thompson .......................... 318/139 |
| 4,008,423 | 2/1977 | Christianson et al. ............... 318/338 |
| 4,068,153 | 1/1978 | Artrip et al. .......................... 318/373 |
| 4,114,076 | 9/1978 | Teranishi et al. .................... 318/139 |

Primary Examiner—David Smith, Jr.
Attorney, Agent, or Firm—Stevens, Davis, Miller & Mosher

[57] ABSTRACT

A method and apparatus for optimally controlling a DC motor used in the propulsion of a vehicle to both provide mechanical driving energy (or traction) to the vehicle during acceleration and to recover electrical energy from the motor when the vehicle is decelerating. The armature and field currents of the DC motor are continuously adjusted for different loads at all speeds of rotation in the traction mode and when in the energy recovery mode to different resistance torques.

12 Claims, 2 Drawing Figures

CONTROL CIRCUIT FOR A DC ELECTRIC MOTOR PARTICULARLY USED IN THE PROPULSION OF AN ELECTRIC VEHICLE

BACKGROUND AND SUMMARY OF THE INVENTION

The present invention relates to a method of controlling a DC electric motor, particularly an electric motor for the propulsion of an automotive vehicle, and to a device for carrying out this method.

One of the main drawbacks of electric traction automotive vehicles powered by storage batteries is their small cruising range. Attempts have been made to increase this cruising range by all means possible, e.g., by increasing the storage capacity per unit of weight of the batteries, by reducing the weight of the vehicles, and by improving the efficiency of the traction (driving) apparatus. In order to increase this efficiency, brake and deceleration energy recovery devices have been provided. The known energy recovery devices are complicated and frequently employ an auxiliary generator in order to be able to recover the maximum amount of energy, which, of course, increases the weight and the cost price of the automotive vehicle.

Furthermore, the known methods for controlling electric motors do not make it possible to obtain optimum operation at all modes, both in traction and in the recovery of energy.

Accordingly, an object of the present invention is a method of controlling an electric motor, in particular a DC electric motor for propelling an automotive vehicle, which permits a simple progressive and uninterrupted control and does not employ an auxiliary generator in order to be able to recover the maximum amount of braking and decelerating energy.

Another object of the present invention is a method of controlling an electric motor which makes it possible to adapt the characteristics of a DC motor to the different loads imposed at all speeds of rotation in the traction mode and to adapt the characteristics of said motor, used as a generator in the energy recovery mode, to the different resistance torques at practically all speeds of rotation.

Another object of the present invention is an apparatus for carrying out said method, which apparatus is as low in weight and cost as possible.

In accordance with the process of the present invention, the armature current of the electric motor is determined and the field current is regulated progressively in a continuous manner by cutting the current as a function of the speed of rotation of the motor by means of a control device which is common to both the traction and energy recovery modes, the motor being preferably of the separately excited type.

The apparatus for controlling the field current comprises a first signal chopper having a control input which produces substantially rectangular signals of preferably constant conduction time and of variable frequency of recurrence. In order to control the armature current, a second signal chopper having a control input and connected to a first amplifier in a traction mode and to a second amplifier in energy recovery mode is provided, the latter chopper producing substantially rectangular signals preferably of fixed frequency of recurrence and variable conduction time.

In accordance with a preferred embodiment of the invention, the armature current and field current choppers are controlled by a common control device, preferably via photocouplers whose emitting portions are arranged in a bridge circuit, the switching between the traction mode amplifier and the energy recovery mode amplifier being controlled by a device which detects the passage through zero of the armature current.

In accordance with the preferred embodiment of the invention, the substantially rectangular signals of fixed frequency of recurrence and variable conduction time which control the two armature current amplifiers are produced by a generator device comprising a comparator, one of the inputs of which is connected to a triangular voltage generator of fixed frequency of recurrence and the other input of which is connected preferably to the receiving device of a photocoupler whose emitting device is connected to the common control device.

In accordance with this same preferred embodiment of the invention, the emitting devices of the photocouplers controlling the field and armature current signal choppers are arranged in a bridge circuit, the input of this circuit receiving, on the one hand, a control current and, on the other hand, a signal proportional to the armature current, the diagonal of the bridge containing a photocoupler emitter which controls the variations in conduction time of the nearly rectangular signals of the armature current chopper, both in acceleration and in deceleration. A first branch of the bridge, which receives the signal proportional to the armature current, contains another photocoupler emitter which controls the variable frequency generator determining the field current, while a second branch of the bridge, which receives the control current, contains yet another emitting device of a photocoupler controlling the generator of variable recurrent frequency determining the field current. The two other branches of the bridge contain unidirectional conduction devices, e.g., diodes, connected in such a manner at to cause a unidirectional current to pass through the diagonal containing the emitter device of the photocoupler controlling the armature current chopper. Thus with a single photocoupler device, one can control the conduction time of the control signals of the armature current signal choppers both in acceleration and in deceleration and braking.

BRIEF DESCRIPTION OF THE DRAWINGS

The present invention will be better understood from the detailed description of an embodiment, given by way of example and not of limitation which is shown in the accompanying drawing, in which.

DETAILED DESCRIPTION OF THE INVENTION

Figure 1:
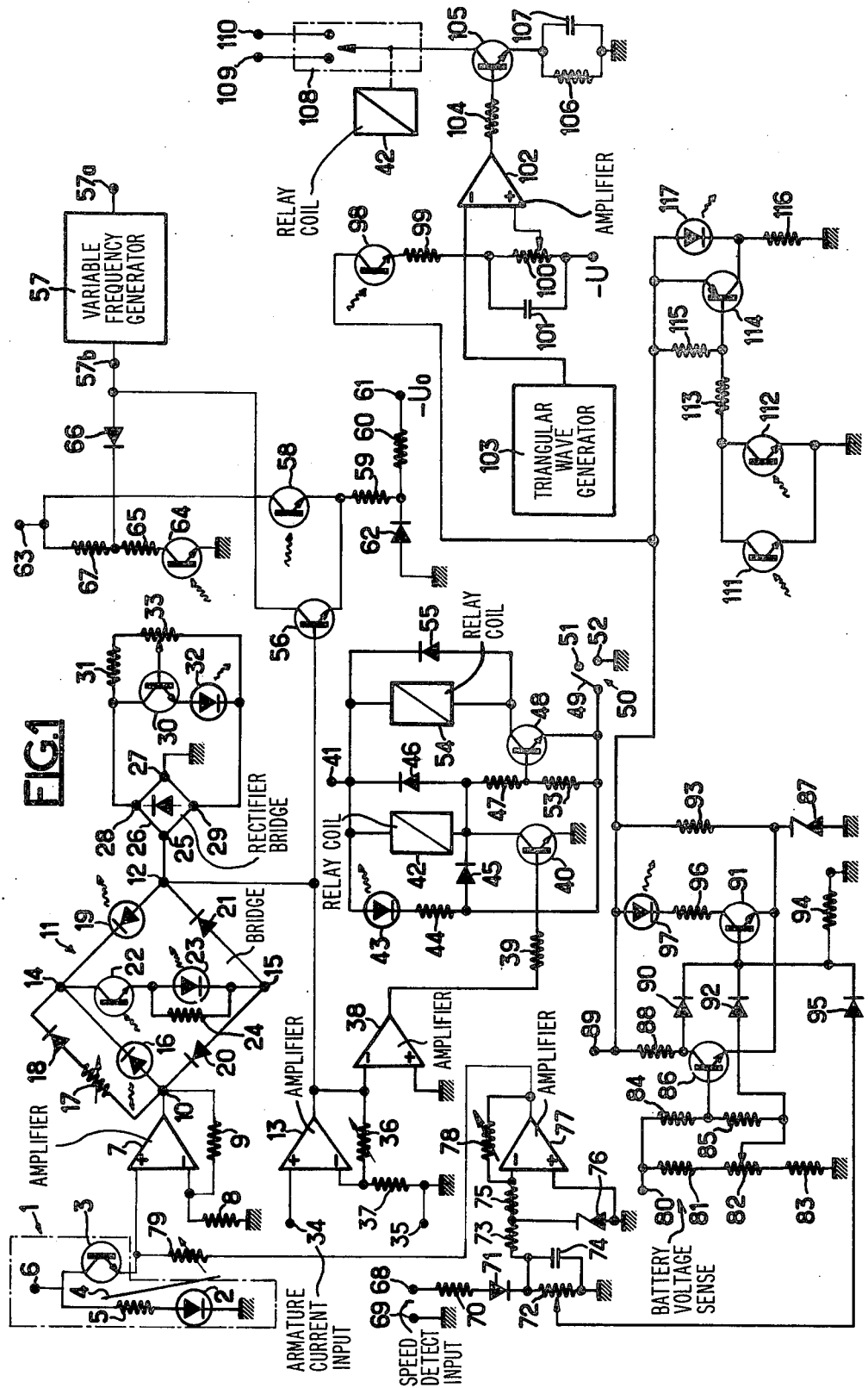
FIG. 1 is a schematic diagram of a control circuit of a separately excited electric traction motor for an electric vehicle in accordance with the present invention.

The circuit shown in FIG. 1 receives a control signal processed by a photocoupler device 1 comprising a light emitting diode 2 cooperating with a phototransistor 3, the light path between the photodiode 2 and the phototransistor 3 being closed in variable manner by a movable flap 4 or similar device connected to the accelerator pedal (not shown) of the vehicle which is equipped with the control device of the invention. The light emitting diode 2 is connected, via a resistor 5 of suitable value, between a terminal 6 connected to the positive voltage of the battery and ground. The collector of the phototransistor 3 is also connected to the supply terminal 6, while its emitter is connected, optionally via a current amplifier, to the positive input of an operational amplifier 7. In known manner, the phototransistor 3 provides the amplifier 7 with a signal which is a function of the position of the movable flap 4, that is to say the amount by which the accelerator pedal has been depressed. Also provided to the positive input of amplifier 7 is the output voltage of the amplifier 77, as explained below. It is obvious that instead of the photocoupler 1, one may employ any device which makes it possible to supply a current or voltage which is variable in response to the position of the accelerator pedal.

The negative input of the amplifier 7 is connected to ground via a resistor 8 and is connected to the output of the amplifier 7 via a resistor 9. The resistors 8 and 9 are preferably substantially equal in value.

The output of the amplifier 7 is connected to one junction 10 of a bridge 11 whose opposite junction 12 is connected to the output of an operational amplifier 13 which delivers a voltage proportional to the armature current to the bridge, as will be explained below. The other two junctions of the bridge 11 are designated 14 and 15 respectively, the bridge 11 being designed such that the current at all times passes, in the diagonal extending through the junctions 14 and 15, from the junction 14 towards the junction 15. In the branch of the bridge 11 passing between the junctions 10 and 14, there is connected a light emitting diode 16 which constitutes the emitter of a first photocoupler, the anode of the diode 16 being connected on the side of the junction 10 and the cathode on the side of the junction 14. In parallel to the light emitting diode 16, there is connected a series circuit composed of a variable resistor 17 and a diode 18, possibly replaced by a resistor of suitable value, the diode 18 being connected in the same direction as the light emitting diode 16. The branch of the bridge 11 between the junctions 12 and 14 contains a light emitting diode 19 constituting the emitter of a second photocoupler, the anode of the diode 19 being connected on the side of the junction 12 and the cathode on the side of the junction 14. In the branch of the bridge 11 contained between the junctions 10 and 15 there is connected a diode 20 whose anode is connected on the side of the junction 15 and its cathode on the side of the junction 10. In the branch of the bridge 11 contained between the junctions 12 and 15 there is connected another diode 21, its anode being connected on the side of the junction 15 and its cathode on the side of the junction 12.

In the diagonal of the bridge 11 passing through the junctions 14 and 15 there is connected a series circuit composed of a phototransistor 22 constituting the receiver of a third photocoupler and a light emitting diode 23 constituting the emitter of a fourth photocoupler, a resistor 24 being shunted over the diode 23, the collector of the phototransistor 22 being connected to the junction 14, and its emitter being connected to the anode of the light emitting diode 23 whose cathode is connected to the junction 15. In this way, when the phototransistor 22 is conductive a current can flow from the junction 14 towards the junction 15.

It is therefore seen that the bridge 11 makes it possible to cause a current to flow in the diagonal 14, 15 either coming from the amplifier 7 or coming from the amplifier 13, the phototransistor 22 and the light emitting diode 23 being always traversed in the same direction by the current flowing in the diagonal 14–15.

The junction 12 of the bridge 11 is connected to an input junction 25 of a conventional rectifier bridge 26 which has not been shown in detail. The junction 27 of the bridge 26 opposite the junction 25 is connected to the ground. The other two junctions of the bridge 26 are designated 28, 29 and are of such a nature that the output current of the bridge 26 flows, in the diagonal 28–29, from the junction 28 to the junction 29. The collector of a transistor 30 and one of the ends of a resistor 31 are connected to the junction 28. The emitter of the transistor 30 is connected to the anode of a light emitting diode 32 constituting the emitter of a fifth photocoupler, the cathode of the diode 32 being connected to the junction 29 of the bridge 26. The other end of the resistor 31 is connected to one end of a variable potentiometer 33 whose other end is connected to the junction 29 of the bridge 26 and therefore to the cathode of the light emitting diode 32, while the wiper of the potentiometer 33 is directly connected to the base of the transistor 30. The elements of the circuit connected between the junctions 28 and 29 of the bridge 26 are so selected and adjusted that for a given current passing through the diagonal 28–29 the light emitting diode 32 emits a certain amount of light in the fifth photocoupler.

The positive input of the operational amplifier 13 is connected to an input terminal 34 and its negative input is connected to ground via a resistor 37 which is advantageously a thermistor arranged at a suitable place on the frame of the motor. A variable resistor 36 is connected between the output of the amplifier 13 and its negative input. The input signal of the amplifier 13 is applied between the terminals 34 and 35, the terminal 35 being directly connected to ground. The input terminals 34 and 35 are connected in known manner to the armature current circuit in such a fashion that the armature current, or a current which is proportional to it, flows from the terminal 35 towards the terminal 34 when the traction motor operates in traction mode and that this current flows in opposite direction from the terminal 34 towards the terminal 35 when the traction motor operates in energy recovery mode, as a DC generator. The operational amplifier 13 also comprises an offset voltage regulating circuit (not shown). The output of the amplifier 13 is also connected to the negative input of an operational amplifier 38 whose positive input is connected to ground. However, the input of the amplifier 38 can also be connected to the output of the amplifier 7 since, as explained below, the armature current is practically cancelled out at the same time as the control current at the output of the amplifier 7. The operational amplifier 38 also comprises an offset voltage regulating circuit (not shown), which voltage is regulated as explained below. The output of the amplifier 38 is connected via a resistor 39 to the base of a transistor 40. The emitter of the transistor 40 is directly connected to ground and its collector is connected to a supply voltage terminal 41, which may advantageously be the same as the terminal 6, via the excitation coil 42 of a relay (not shown) for inversion of the amplifiers in traction and in an energy recovery mode, as explained below. In parallel with the excitation coil 42 there is connected a series circuit composed of a light emitting diode 43, a resistor 44, and a diode 45, the anode of the diode 43 being connected on the side of the terminal 41 and the anode of the diode 45 being connected on the side of the resistor 44. Also connected in parallel with the coil 42 is a diode 46 whose cathode is connected to the supply terminal 41. The collector of the transistor 40 is also connected via a resistor 47 to the base of a transistor 48 whose emitter is directly connected to the movable contact 49 of a switch 50 which is controlled by the forward-reverse selection device (not shown) of the vehicle equipped with the circuit of the present invention. A first stationary contact 51 of the switch 50 is not connected to any circuit, while the second stationary contact 52 of the switch 50 is connected directly to ground. For forward travel of the vehicle, the moving contact 49 is in contact with the stationary contact 51 and in reverse travel it is in contact with the stationary contact 52. The base of the transistor 48 is connected via a resistor 53 to its emitter as well as to the moving contact 49 of the switch 50 and to the junction point of the resistor 44 and the diode 45. The collector of the transistor 48 is connected to the voltage supply terminal 41 via the excitation coil 54 of a relay (not shown) for the reversal of the field winding of the traction motor (not shown). Shunted over the excitation coil 54 there is connected a diode 55 whose cathode is connected to the terminal 41.

The output of the amplifier 13 which is connected to the junction 12 of the bridge 11 is also connected to the base of a transistor 56 whose collector is connected to the frequency control input 57b of a generator 57 for the generating of rectangular signals having a variable recurrent frequency and fixed cyclic ratio. Such a generator has been selected due to the fact that a cyclic ratio of 100% is not necessary in order to control the field current and due to the fact that the coefficient of self-induction of the field winding is generally substantial (on the order of magnitude of 1 H or more), the cutout frequency of the field current being capable of varying within a wide range without producing any harmful undulation. However, one could use a signal generator providing signals of fixed frequency and variable conduction time. The generator 57 is of a known type and will not be described in detail. The output 57a of the generator 57 is connected to a conventional amplifier (not shown) for controlling the field current of the motor. The emitter of the transistor 56 is connected to the emitter of a phototransistor 58 constituting the receiver of the first photocoupler, and also to one of the ends of a resistor 59 whose other end is connected via a resistor 60 to a terminal 61 which receives a suitable negative voltage $-U_O$, as well as to the cathode of a diode 60 whose anode is directly grounded. The collector of the phototransistor 58 is connected directly to a voltage supply terminal 63 which may also be combined with the terminals 41, 61 and 6. The phototransistor 58 cooperates with the light emitting diode 16 in known manner to form the first photocoupler.

The emitter of another phototransistor 64, constituting the receiver of the second photocoupler, is directly connected to ground and has its collector connected to the frequency control input 57b of the generator 57 via a resistor 65 and a diode 66 whose anode is connected to the control input 57b of the generator 57. The point common to the resistor 65 and the diode 66 is connected via another resistor 67 to the voltage supply terminal 63. The phototransistor 64 cooperates with the light emitting diode 19 in known manner to form the second photocoupler.

The circuit of FIG. 1 also has two input terminals 68 and 69 connected to a speed detector (not shown) of the traction motor. The terminal 69 is directly grounded and the terminal 68 is connected via a resistor 70 to the anode of a diode 71 whose cathode is connected to one of the ends of a potentiometer 72, the other end of which is grounded, the said cathode of the diode 71 being also connected to one of the ends of a resistor 73 as well as to one of the electrodes of a capacitor 74, the other electrode of which is directly connected to ground. The other end of the resistor 73 is connected to one of the ends of a resistor 75 as well as to the cathode of a Zener diode 76 whose anode is directly connected to ground. The other end of the resistor 75 is connected to the negative input of an operational amplifier 77 whose positive input is directly connected to ground. The output of the amplifier 77 is connected to its negative input via a variable negative feedback resistor 78. The output of the amplifier 77 is also connected via a variable resistor 79 to the positive input of the amplifier 7. The circuit formed in particular by the diode 71, the resistor of the potentiometer 72, and the capacitor 74 is a rectifying circuit for the alternating voltage which arrives at the terminals 68 and 69. However, it will be understood that if a continuous voltage proportional to the speed of rotation of the traction motor were delivered directly to the terminals 68 and 69 one could eliminate at least the diode 71 and the capacitor 74.

Between an input terminal 80 of the circuit of FIG. 1 and ground, a voltage is passed which is proportional to the voltage of the storage battery feeding the traction motor. Between the terminal 80 and ground there is connected the series circuit formed, in sequence, of a resistor 81, the resistor of a potentiometer 82, and a resistor 83. Between the terminal 80 and the wiper of the potentiometer 82 there is connected the series circuit formed of a resistor 84 and another resistor 85. The junction point of the resistors 84 and 85 is connected to the base of a transistor 86 whose emitter is connected to the cathode of a Zener diode 87, the anode of which is directly connected to ground. The collector of the transistor 86 is connected, via a resistor 88, to a supply terminal 89 which can be combined with the terminals 6, 41, and 63. The collector of the transistor 86 is also connected to the anode of a diode 90 whose cathode is connected to the base of a transistor 91. The base of the transistor 91 is also connected to the cathode of a diode 92 whose anode is directly connected to the wiper of the potentiometer 82. The emitter of the transistor 91 is connected to the emitter of the transistor 86 as well as to the cathode of the Zener diode 87. The cathode of the Zener diode is connected via a resistor 93 to the supply terminal 89. The base of the transistor 91 is also connected, via a resistor 94, to ground and is connected to the cathode of a diode 95 whose anode is connected to the wiper of the potentiometer 72. The collector of the transistor 91 is connected, via a resistor 96, to the cathode of a light emitting diode 97 constituting the emitter of a sixth photocoupler, its anode being connected to the supply terminal 89.

The circuit of FIG. 1 also contains a phototransistor 98 constituting the receiver of the fourth photocoupler. The collector of the phototransistor 98 is connected directly to the supply terminal 89 and its emitter is connected, via a resistor 99, to one of the ends of a potentiometer 100 whose other end is connected to a voltage $-U$. In parallel to the two ends of the potentiometer 100 there is connected a decoupling capacitor 101. The wiper of the potentiometer 100 is connected to the positive input of a comparator amplifier 102 having a very high gain on the order of magnitude of several tens of thousands. The negative input of the comparator amplifier 102 is connected to the output of a triangular wave generator 103 which generates signals of constant frequency and zero average value and which is known per se and will not be described further.

The output of the comparator amplifier 102 is connected via a resistor 104 to the base of a transistor 105. The emitter of the transistor 105 is connected to ground via a resistor 106 and a capacitor 107, the resistor 106 and the capacitor 107 forming, in a known manner, a rapid blocking circuit for the transistor 105 in a rapid switching mode. The collector of the transistor 105 is connected to the moving contact of a reversing switch 108 of the relay (not shown) whose excitation coil is designated as 42. The two stationary contacts of the switch 108 are connected to output terminals 109 and 110 respectively, which constitute the input terminals of the circuit of FIG. 2 described below. When the coil 42 is not excited, the corresponding position of rest of the switch 108 assures connection with the terminal 109.

The circuit of FIG. 1 further comprises a phototransistor 111 constituting the receiver of the sixth photocoupler and another phototransistor 112 constituting the receiver of the fifth photocoupler. The emitters of the phototransistors 111 and 112 are connected to each other and to ground and their collectors are connected to each other and, via a resistor 113, to the base of a transistor 114, this base being connected via a resistor 115 to the voltage supply terminal 89. The emitter of the transistor 114 is directly connected to the terminal 89 and its collector is connected to ground via a resistor 116.

The emitter of the transistor 114 is connected to the anode of a light emitting diode 117 constituting the emitter of the third photocoupler, the cathode of the diode 117 being connected to the collector of the transistor 114. It will be noted that all the transistors of the circuit of FIG. 1 are NPN transistors, except for the transistor 114 which is a PNP transistor, but the conductivity types of at least some of the transistors could be reversed.

Figure 2:
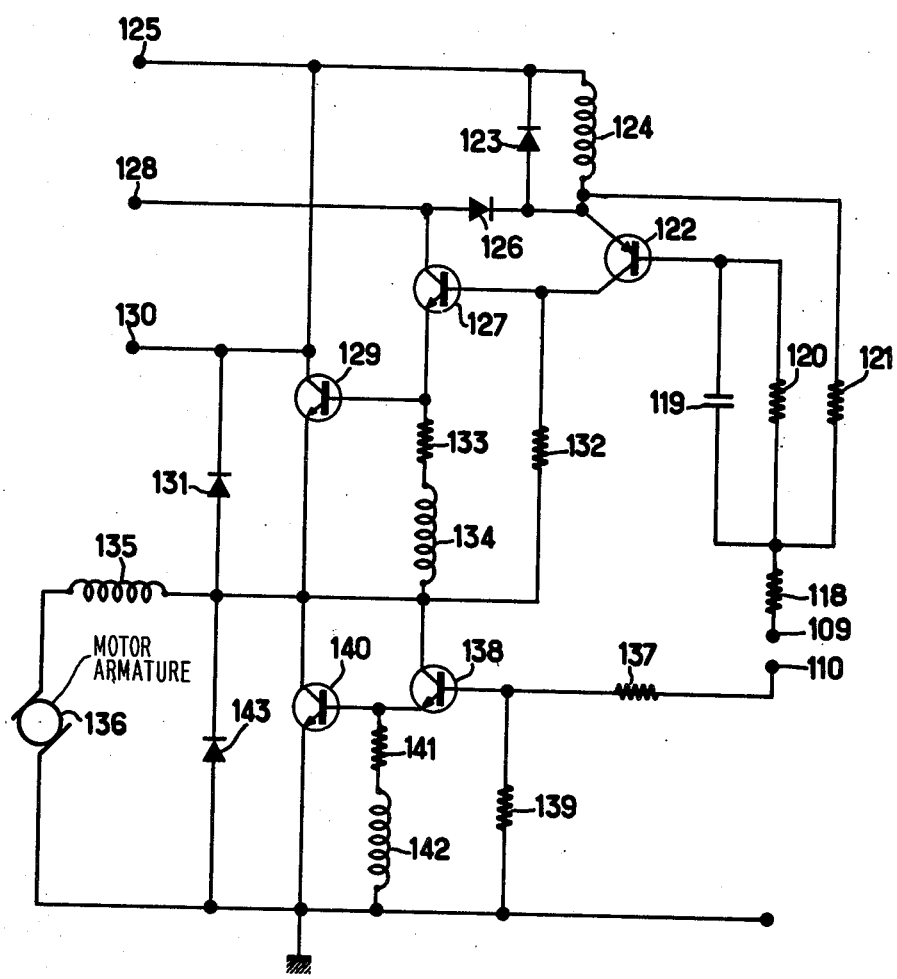
FIG. 2 is a schematic diagram of a circuit of amplifiers for control of the motor armature current, in accordance with the present invention.

FIG. 2 shows the diagram of an embodiment of an armature-current control circuit connected to the terminals 109 and 110 of the circuit of FIG. 1.

The terminal 110 is connected, via a resistor 118, to the junction point of a parallel circuit, consisting of a capacitor 119 and a resistor 120, with a resistor 121. The parallel circuit formed by the capacitor 119 and the resistor 120 is connected at its other end to the base of a transistor 122. The resistor 121 is connected at its other end to the emitter of the transistor 122. The emitter of the transistor 122 is connected, via a parallel circuit formed by a diode 123 and a coil 124, to a terminal 125 fed by a voltage slightly higher than the battery voltage by about +2 volts, obtained for instance by means of a conventional direct current converter, the anode of the diode 123 being on the emitter side of the transistor 122.

The emitter of the transistor 122 is also connected to the cathode of a diode 126, whose anode is connected to the collector of a transistor 127. The collector of the transistor 122 is directly connected to the base of the transistor 127. The collector of the transistor 127 is connected to a terminal 128 receiving a supply voltage slightly higher than the battery voltage by about +1 volt, which may also be obtained by means of a DC converter, which is preferably the same as the one supplying the terminal 125.

The emitter of the transistor 127 is connected to the base of a transistor 129 whose collector is connected, on the one hand, directly to a terminal 130 at which the voltage of the supply battery of the motor arives and, on the other hand, to the cathode of a diode 131 whose anode is connected to the emitter of the transistor 129.

The base of the transistor 127 is connected via a resistor 132 to the emitter of the transistor 129. The base of the transistor 129 is connected via the series circuit formed by a resistor 133 and a coil 134 to its emitter. The emitter of the transistor 129 is connected via a coil 135 to one of the terminals of the armature 136 of the propulsion motor (not shown) of the vehicle, the other terminal of the armature 136 being connected to ground.

The terminal 110 is connected via a resistor 137 to the base of a transistor 138, whose collector is connected to the junction point of the resistor 132, the coil 134, the emitter of the transistor 129, the anode of the diode 131, and the coil 135. The base of the transistor 138 is also connected to ground via a resistor 139. The emitter of the transistor 138 is connected to the base of a transistor 140 as well as to ground via the series circuit formed of a resistor 141 and a coil 143. The collector of the transistor 140 is connected to the emitter of the transistor 129 as well as to the cathode of a diode 143 whose anode is connected to ground. The emitter of the transistor 140 is directly connected to ground.

The operation of the circuit of FIG. 1 will now be explained. Let us assume that initially this circuit has just been connected to its supply voltage and that the vehicle in which it is mounted is at rest, the traction motor being a separately excited motor.

Starting from this initial instant, let us assume that the driver gradually depresses the accelerator to begin acceleration of the vehicle. The movable flap 4, which is mechanically fastened to the accelerator, moves in such a manner as to progressively free the path of the light rays emitted by the light emitting diode 2 and sensed by the phototransistor 3. The phototransistor 3, whish initially was blocked by the movable flap 4 interrupting all the rays of light emitted by the light emitting diode 2, becomes progressively more conductive and passes a constantly increasing signal to the positive input of the amplifier 7. The constantly increasing signal at the positive input of the ampifier 7 produces at the junction 10 of the bridge 11 a voltage which constantly increases from the value zero which was originally present at the initiation of acceleration. This constantly increasing voltage at the junction 10 produces a constantly increasing current in the light emitting diode 23 present in the diagonal 14-15 of the bridge 11. The phototransistor 98 which forms the fourth photocoupler with the light emitting diode 23 and which was blocked at the initial moment of acceleration becomes progressively conductive as the current passing through the light emitting diode 23 increases. The phototransistor 98 therefore passes a progressively increasing current into the potentiometer 100 and, correspondingly, the comparator 102 receives the progressively increasing voltage at its positive input. This progressively increasing voltage at the positive input of the comparator 102, which also receives a triangular wave voltage from the generator 103 at its negative input, produces at the output of the high-gain comparator 102, rectangular signals having a fixed frequency and a time of conduction which increases as the conduction of the phototransistor 98 increases. This rectangular voltage is sent, in the traction mode, as explained below, to the terminal 109 via the transistor 105 and causes the armature current to increase in known manner from a zero value which it had at the initial moment of acceleration. The increase in the armature current is transmitted, via the amplifier 13, to the bridge 11, increasing the potential of the junction 12, the potential of the junction 12 being at all times less than that of the junction 10 in the traction mode, and the speed of rotation of the motor increases from a zero value. The increase in potential at the junction 12 of the bridge 11 causes the current passing through the branch 12-14 of the bridge 11 to increase, and the light emitting diode 19, which did not emit light at the initial moment of acceleration, emits an increasingly more intense light which causes the phototransistor 64, which was blocked at the initial moment of acceleration to become progressively more conductive. The increase in conductivity of the phototransistor 64 causes a decrease in the potential at the input 57b of the generator 57 which is connected in such a manner that a decrease of potential at its control input 57b causes an increase in its output frequency while inversely, an increase of potential at input 57b causes a decrease in its output frequency. The increase in the frequency of recurrence of the output signals produced by the generator 57 causes the current supplied to the field winding by the field current chopper (not shown) to increase in a known manner. The field current, which was zero at the initial moment of acceleration, therefore increases and rapidly reaches its saturation value if the increase in the speed of rotation of the motor continues. In one embodiment in which the armature current of the motor had a maximum value of about 150 amperes and a nominal value of about 70 amperes, the saturation of the field current was reached for an armature current of about 50 amperes.

The variable resistor 17 which is shunted across the light emitting diode 16 is selected to have a value less than that of the resistor 24 shunted across the light emitting diode 23. In one embodiment, the value of the resistor 17 was about 68 ohms, while the value of the resistor 24 was about 330 ohms. Therefore, the light emitting diode 23 starting from the initial moment of acceleration is traversed by a larger current than that passing through the light emitting diode 16, and the diode 23 becomes saturated before the diode 16. Therefore, the phototransistor 98 which is part of the fourth photocoupler will be saturated more rapidly than the phototransistor 57 which is part of the first photocoupler.

If the increase in the control current continues, the phototransistor 98 rapidly becomes saturated and the conduction time of the signals sent by the transistor 105 to the armature current amplifier become equal to the period of recurrence of said signals, that is to say one reaches a cyclic ratio of 100% of these signals. In the aforementioned embodiment, the electric motor was a DC traction motor of an automotive vehicle and was associated with a mechanical speed variator device making it possible simultaneously to adapt the torque of the motor to its load, to provide a differential transmission device, and to maintain the optimum operation of the motor, both in traction and in energy recovery and braking mode. However, it it obvious that the invention is not limited to an automotive vehicle traction motor and that it can be applied to the control of any DC motor with shunt or compound excitation or preferably separate excitation.

In the above embodiment, a cyclic ratio of 100% of the signals sent by the transistor 105 corresponds to a speed of rotation of the motor of about 2700 rpm. If the speed of rotation of the motor increased beyond this value of 2700 rpm, the mechanical speed variator device enters into action at a speed of rotation of the motor of about 3000 rpm.

If then the control current increases further (phototransistor 3 is progressively more illuminated by the light emitting diode 2), the light emitting diode 16 becomes brighter and brighter, which makes the phototransistor 58 progressively more conductive, thus tapping off a portion of the current passing through the resistor 59, which results in a decrease in the current of the collector of the transistor 56 and therefore an increase in the potential at the input 57b of the generator 57 and therefore a decrease in the frequency of recurrence of the signals supplied by the generator 57. This decrease in the frequency of the signals supplied by the generator 57 results in a decrease in the field current, which had reached the saturation value as stated above, this in such a manner that the ratio: (battery voltage minus the counter electromotive force of the motor) divided by sum of the resistors of the armature circuit=armature current is nearly maintained for all the speeds of rotation of the motor higher than the value for which the cyclic ratio of the rectangular signals supplied by the armature current chopper is equal to 100%, that is to say always in the example, for speeds ranging from about 2700 rpm to about 5500 rpm, the armature current being regulated by means of the field current via the photocoupler comprising the elements 16 and 58, the fourth photocoupler which comprises the elements 23 and 29 no longer acting, the light emitting diode 23 being saturated as stated above. Accordingly, in the aforementioned embodiment, the speed of the vehicle is regulated, starting from a speed of about 25 Km an hour, corresponding to the speed of rotation of about 2700 rpm of the motor, to the maximum speed solely by the action of the field current.

The phase of deceleration of the motor from its maximum speed of rotation to stop will now be explained. At the maximum speed, the cyclic ratio of the signals sent by the transistor 105 is 100% and the field current is less than its saturation value, as explained above. When the driver progressively releases the accelerator, the control current supplied to the bridge 11 decreases and, in particular, the current flowing through the light emitting diode 16, which causes the current flowing through the phototransistor 58, cooperating with the diode 16 in the said first photocoupler, to decrease, which causes the field current to increase. Due to the fact that the counter electromotive force of the motor then increases, the difference between its supply voltage and its counter electromotive force decreases, which causes a decrease in the armature current, which previously had a value of more than 50 amperes, in the embodiment indicated above with a motor of rated voltage of 96 volts and rated armature current of 70 amperes. The increase in the field current continues only for a brief instant since the armature current decreases rapidly, as stated above, and because the light emitting diode 23, shunted by the resistor 24, starts to become desaturated, resulting in the decrease of the conduction of the phototransistor 98 and therefore a decrease in the armature current. There is then a simultaneous decrease of the armature and field currents until the simultaneous cancellation of these two currents occurs.

It will be noted that during this first phase of deceleration, the speed of the motor varies relatively little, due to its inertia and the relatively short time of this phase (about 0.1 sec.). It will be noted that the voltage of the junction 12 of the bridge 11, i.e., the output voltage of the amplifier 13, follows the variations of the voltage of the junction 10 of the bridge 11, i.e., the output voltage of the amplifier 7, while being less than the latter in absolute value. In the traction mode the output voltage of the amplifier 13 is less positive than the output voltage of the amplifier 7 and in deceleration mode the output voltage of the amplifier 13 is less negative than that of the amplifier 7. Upon the cancellation of the armature current, these two voltages are equal.

At the end of the first deceleration phase, when the armature current is cancelled out, the comparator 38, which is entrusted with detecting the passage through zero of this armature current, produces a positive signal at its output, its positive input being connected to ground. This positive output signal of the comparator 38 causes the transistor 40 which had been previously blocked to become conductive and causes the flow of a current in the excitation coil 42 which controls the reversal of the reversing contact 108, and the collector of the transistor 105 which was previously connected to terminal 109 is connected to the terminal 110. Furthermore, when the transistor 40 is made conductive, its collector potential decreases and the light emitting diode 43 lights up. This diode 43 is advantageously arranged on the instrument panel of the vehicle and indicates the shift of operation to the energy recovery mode, which commences upon the reversing of the switch 108.

After its passage through zero, the armature current is reversed and the input 34 of the amplifier 13 becomes positive with respect to the input 35, which provides at the output of the amplifier 13 an increasingly negative voltage as the armature current increases in an opposite direction, the output voltage of the amplifier 7 becoming more and more negative and being followed by the output voltage of the amplifier 13; the light emitting diode 19 is then traversed by an increasing current, which causes the phototransistor 64, which had been blocked, to become conductive, resulting in an increase in the field current and the electromotive force of the motor, which then operates as generator. This electromotive force, which was zero for zero field current and armature current, passes through a value equal to the voltage of the supply battery of the motor (disregarding losses) and if the deceleration still continues, this electromotive force becomes greater than the battery voltage plus the various losses (diodes, conductors, etc.). The armature current then becomes equal to the ratio:

$$\frac{V - (U_A + U_P)}{\Sigma R}$$

V being the electromotive force of the motor operating as generator, $U_A$ being the battery voltage, $U_P$ being the drop in voltage due to the losses, and $\Sigma R$ being the sum of the resistances of the armature current circuit. The cyclic ratio of the signals transmitted by the transistor 105 is then zero and if the speed of rotation of the motor is greater than the aforesaid threshold for which the field current reaches saturation (about 2700 rpm in the example indicated above), the regulating of the armature current is controlled solely by the field current.

The speed of rotation of the motor continuing to decrease, it passes through a value for which the field current has its saturation value, the current passing through the light emitting diode 19 being maximum. During this second phase of the deceleration process, which phase occurs between the cancellation of the field current, the electromotove force of the motor operating as a generator is sufficiently high to permit it to charge the battery directly via the coil 135 and the diode 131.

If the speed of rotation of the motor decreases further, the maximum electromotive force of the motor operating as a generator becomes less than the voltage of the battery plus the drop in potential due to the losses, and the armature current decreases very slightly in absolute value. The current passing through the light emitting diode 19 is at the saturation value and the current passing through the light emitting diode 23 increases from the relatively low value which is previously had, with the result that the current passing through the phototransistor 98 also increases from the low value which it previously had, thus bringing about an increase in the cyclic ratio of the signals transmitted by the transistor 105 from a value of nearly zero which it previously had. Thus the circuit of the invention makes it possible to maintain, at least at the beginning of the third phase of the deceleration process when the electromotive force of the motor operating as a generator becomes less than the battery voltage (disregarding losses), the armature current practically constant by maintenance of the current in the coil 135, charging this coil 135 by the armature 136 via the switching transistor 140 for periods of time which increase as the speed of rotation of the motor decreases. Therefore, the circuit consisting of armature current chopper, amplifier (comprising the transistors 138 and 140), and armature operates as a booster in order to charge the battery at the beginning of the third phase of deceleration.

Finally, if the speed of rotation of the motor decreases further and is cancelled out, the cyclic ratio of the signals transmitted by the transistor 105 reaches 100%, the armature current can then no longer be maintained and it decreases until it is cancelled out upon the stopping of the motor, and therefore upon the stopping of the vehicle. Thus one can recover the maximum possible amount of deceleration and braking energy by charging the traction battery, with a single machine.

It will be noted that in the operation of the motor described above, this motor has, in traction mode, a characteristic similar to that of a series-excited motor when the armature current has a value of between 0 and $I_o$, $I_o$ corresponding to a field current having its saturation value. In the above-indicated example, that is to say for a motor of rated voltage of 96 volts and a power of 5.5 kw, $I_o$ has a value of about 40–50 amperes, that is to say approximately half of the rated armature current. On the other hand, in the energy recovery phase, the motor operating as a generator has at all times a characteristic similar to that of a shunt-exciter motor.

As the circuit comprising in particular the amplifiers 7 and 13 and the bridge 11 is a control circuit of the motor, the effect produced always has a tendency to oppose the cause. This cause, which is for instance the decrease in the output voltage of the amplifier 7, results in a decrease in the current in the light emitting diodes 16 and 23 and is compensated for by the effect, namely the decrease of the output voltage of the amplifier 16, that is to say the decrease of the armature current. Moreover, the output voltage of the amplifier 13 is proportional to the armature current. Therefore, taking the speed of rotation of the motor as a parameter, the acceleration pedal which is connected to the moving flap 4 and controls the current delivered by the phototransistor 3, controls the output voltage of the amplifier 7 and therefore that of the amplifier 13 and therefore the armature current, and thus the accelerator pedal controls the driving or decelerating torque in a traction mode as well as in energy recovery mode.

The role of the amplifier 77 shown in FIG. 1 is to make it possible to obtain a negative voltage at the positive control input of the amplifier 7 when the control current delivered by the phototransistor 3 is sufficiently low or even zero in the energy recovery mode. The amplifier 77 also has the role of making it possible to cancel out the field current upon the stopping of the motor. If the amplifier 77 were eliminated, one could cancel out the field current by sending a suitable negative voltage of the order of a few volts to the positive input of the amplifier 7. The operation of the vehicle would, for all practical purposes, not be disturbed and upon the stopping of the motor, as soon as the circuit shown in the drawing were fed with voltage, one would have a field current which reaches its saturation value almost immediately.

It is obvious that if, at any moment during the energy recovery mode, the driver again depresses the accelerator pedal, the control circuit of the present invention will pass again into the state corresponding to the traction mode, and in particular there will be a reversing of the switch 108 and extinction of the light emitting diode 43.

The amplifier circuits shown in FIG. 2 are of conventional design, with the exception of the supply of the collector of the transistor 127 with a voltage which is about one volt higher than the battery voltage and with the exception of the supply of the emitter of the transistor 122 with a voltage which is about 2 volts higher then the battery voltage. The feed voltages of the collector of the transistor 127 and of the emitter of the transistor 122 can be obtained, for instance, by means of a DC converter, fed by the storage battery of the traction motor, since the currents passing through the two transistors are relatively small and the losses due to the use of the converter are negligible as compared with the savings in energy effected due to the better saturation of these two transistors, obtained by these two voltages which are higher than the battery voltage. As a matter of fact, by boosting the collector of the transistor 127 and the emitter of the transistor 122 as compared with their respective bases, one increases the saturation of these two transistors, when they are conductive, that is to say there is much less loss of current in these two transistors. Thus it has been noted in one embodiment that the losses due to these two transistors could be reduced by several tens of watts as a result of this boosting.

As stated above, it is preferable to use a separately excited DC motor since one can also act separately on the field circuit and the armature, which obviously permits a very great flexibility in control of the motor.

If one were to employ a series excitation motor one could obviously eliminate the generator 57 but it would be necessary to replace the relay (not shown) controlled by the excitation coil 54 by a double-pole reversing switch whose contacts could withstand the armature current, which might be very high. Moreover, one could not regulate the speed of rotation of the motor by acting solely on the field circuit, unless the field circuit were partially shunted, both in traction and in energy recovery, by means of an ohmic resistor of low value. However, in this latter case it would be necessary to find a shunt of very low ohmic value which could be easily connected and disconnected alternately to the field magnet, to assure the regulation. Such a shunt could not even be formed of a thyristor or equivalent semi-conductor device now known since its residual voltage is much too high.

If one were to use a shunt-excited motor one could not effect a control based on speed since the inductor of such motors is not accessible and one could only effect a control based on torque by the cutting of the current, but one would obviously not have the flexibility of use which is obtained with a separately excited motor.

One could use a motor with compound excitation and one would then employ practically the same circuit as that shown in FIG. 1, but it would be necessary to provide the shortcircuiting of the series winding during the energy recovery mode and in reverse travel. It would be necessary to over-feed the inductor as a function of the ratio of the inductions obtained, due to the series excitation and due to the parallel excitation.

The bridge 11 contains, in its diagonal 14–15, a phototransistor 22 which is normally saturated by the light emitting diode 117 which cooperates with it. This light emitting diode 117 is in parallel with the transistor 114 which is normally blocked by the phototransistors 111 and 112 which are connected to its base and which are normally blocked, as explained above. As soon as one of the phototransistors 111 or 112 is unblocked, it unblocks the transistor 114, which decreases the difference in potential between its emitter and its collector, resulting in a decrease in the brightness of the light emitting diode 117, causing a decrease in conduction of the phototransistor 22. The decrease in conduction of the phototransistor 22 results in a decrease of the current in the diagonal 14–15 of the bridge 11. Due to the fact that the current passing through the bridge 11 decreases, it is seen in particular that the brightness of the light emitting diode 23 decreases, which decreases the armature current and avoids any damage to the battery or the motor.

The phototransistor 111 cooperates with the light emitting diode 97 to assure safety in case the motor operates at too high a speed (overspeed) and in case an excessive increase or decrease of the battery voltage occurs, as explained below.

Safety in case of overspeed of the motor is controlled by a motor speed detector (not shown) connected with the terminals 68 and 69 of the circuit of FIG. 1. The alternating voltage produced by the speed detector at the terminals 68 and 69 is rectified by the diode 71 and the capacitor 74, and the resultant direct current voltage appears at the terminals of the potentiometer 72. A part of the voltage developed at the terminals of the potentiometer 72 is tapped off by its wiper and sent to the terminals of the bias resistor 94 of the base of the transistor 91. When the speed of the motor increases excessively, the bias voltage of the base of the transistor 91 increases and makes this transistor conductive at a certain threshold which is regulated by means of the potentiometer 72. As soon as the transistor 91 becomes conductive, the light emitting diode 97 lights up, which makes the phototransistor 111 conductive, which in its turn makes the transistor 114 conductive, which causes a decrease in the conductivity of the phototransistor 22, as explained above. This decrease in conductivity of the phototransistor 22 causes a decrease in the current passing through the diagonal 14-15 and therefore the brightness of the diode 23 decreases, which causes a decrease in the armature current and therefore in the speed of the motor. One therefore obtains safety in case of overspeed of the motor, by regulation of the speed via controlling the armature current.

Safety in the case of over-voltage or under-voltage of the battery is achieved in the following manner. A voltage proportional to the battery voltage, or else the battery voltage itself, is sent directly to the terminal 80. This voltage appears at the terminals of the series circuit formed by the resistors 81 and 83 and the potentiometer 82. Between the wiper of the potentiometer 82 and ground there is tapped off an adjustable voltage which is also proportional to the battery voltage. This adjustable voltage is passed, via the diode 92, to the base of the transistor 91, the emitter of which receives the reference voltage of the Zener diode 87. When the voltage of the battery increases and exceeds a predetermined value, the voltage sent to the base of the transistor 91 via the diode 92 increases until it makes transistor 91 conductive and causes the unblocking of the phototransistor 111, which in its turn causes a decrease in the conductivity of the phototransistor 22, as explained above.

It is obvious that if the cause which has brought about the decrease in conductivity of the phototransistor continues, the latter becomes blocked and the motor stops due to cancellation of the armature and field currents.

The resistors 84 and 85 are calculated, as a function of the resistors 81 and 83 and of the value of the potentiometer 82, so as to assure at the base of the transistor 86 a potential which normally takes it conductive while the voltage of the battery does not drop below a given threshold value, the emitter potential of the transistor 86 being also fixed by the Zener diode 87. If the battery voltage drops below the given threshold, the circuit containing the elements 81 and 85 tends to block the transistor 86, which causes its collector potential to increase. This increase is transmitted via the diode 90 to the base of the transistor 91, making it conductive, which causes a decrease in conductivity of the phototransistor 22 in accordance with the process described above. One thus assures safety in case of excessive decrease of the battery voltage.

The rectifying bridge 26 connected between the junction 12 of the bridge 11 and ground makes it possible to assure limiting of the armature current. The rectifying bridge 26 receives a voltage which is proportional to the armature current via the amplifier 13. In a normal state, that is to say when the control of the armature current is such that this current does not exceed a permitted maximum value, the voltage between the junctions or output terminals 28 and 29 of the bridge 26 is not high and the voltage developed between the emitter and the base of the transistor 20 blocks the transistor. When the armature current increases and exceeds a given value, the voltage of the terminals 28-29 of the bridge 26 increases, the difference in potential between the base and the emitter of the transistor 30 increases, and the latter becomes conductive beyond its biasing threshold. When the transistor 30 becomes conductive, the light emitting diode 32 lights up and makes the phototransistor 112, with which it cooperates, conductive. Since the phototransistor 112 is connected in parallel to the phototransistor 111, it acts in the same manner as the phototransistor 111; as soon as it becomes conductive, the transistor 114 becomes conductive, the brightness of the light emitting diode 117 decreases, and the phototransistor 22 becomes less conductive. Thus one assures safety of the armature current by limiting it as soon as it exceeds a given value.

The thermistor 37, arranged, for example, on the frame of the motor controlled by the circuit of FIG. 1 and connected between the negative input of the amplifier 13 and ground, decreases in value when the motor warms up, and makes it possible to increase the gain of this amplifier 13 by applying to it a negative feedback in a decreasing amount. This increase of the gain of the amplifier 13 results in an increase in the current injected into the rectifying bridge 26, which makes it possible to more rapidly limit the armature current and therefore to eliminate the cause of heating, in particular upon starting or as a result of the instantaneous overload of the motor with a current, this current limited by the device comprising the transistor 30; at a value higher than the rated current of the motor the latter is heated as is the thermistor 37, which progressively reduces the armature current to its rated value by increasing the gain of amplifier 13.

It is obvious that one can provide other safeties similar to the safties described above by connecting, in parallel to the phototransistors 111 and 112, other phototransistors cooperating with other light emitting diodes which light up when certain thresholds have been exceeded.

The switching device 50 shown in FIG. 1 is firmly connected to a device controlled by the driver of the vehicle to bring about the forward or rearward travel of the vehicle. For the position of the switch 50 shown in FIG. 1, that is to say when its movable contact 49 rests on the stationary contact 51, the transistor 48 is blocked due to the fact its base resistor 53 is not connected to ground and no current flows, the difference in potential between the base and the emitter 48 being then very slight and blocking this transistor. Since the transistor 48 is blocked, no current passes through the excitation coil 54 of the reversing relay (not shown) of the field winding of the motor. The state of rest of the relay controlled by the excitation coil 54 corresponds to forward travel of the vehicle.

As soon as the moving contact 49 of the switch 50 is brought onto the stationary contact 52, a current flows in the resistor 53 which unblocks the transistor 28 and causes a current to pass through the excitation coil 54. The relay controlled by this coil 54 then moves into operating position and reverses the connection of the field winding of the motor, which can then turn in an opposite direction and cause the vehicle to go in reverse.

The grounding of the movable contact 49 of the switch 50 causes current to pass through the light emitting diode 43 which then signals the engagement of reverse travel. As explained above, the illuminating of the light emitting diode 43 indicates the recovery mode. In order to avoid the use of an additional light emitting diode, diode 43 also serves to signal the selection of reverse travel since it is doubtful that any confusion in the mind of the driver would exist between the engagement of reverse travel and of the energy recovery system since, in general, the reverse travel of an automobile vehicle is relatively slow and cannot give rise to recovery of energy. However, if one wished to indicate reverse travel by means of a light emitting diode other than the diode 43, this additional light emitting diode would be connected between the feed terminal 41 and the junction point of the diode 46 of the resistor 47 with a suitable series resistor, of course disconnecting the junction point of diode 46 and resistor 47 from the collector of the transistor 40.

With the motor stopped and the current supplied by the phototransistor 3 being zero, the offset voltage of the amplifier 38 is adjusted in such a manner as to block the transistor 40.

If current supplied by the phototransistor 3 is zero and the speed of the motor is not zero (for instance during energy recovery), if one closes the switch 50 (movable blade 49 connected to ground), the transistor 40 is saturated and the transistor 48 remains blocked until the speed of rotation of the motor is zero, since conduction of the transistor 43 means the blocking of the transistor 40.

Moreover, if one closes the switch 50, the current supplied by the phototransistor 3 being positive and the speed of rotation of the motor being other than zero (case of traction in forward travel), the counter electromotive force of the motor becomes negative, and the armature delivers current into the coil 135 via the diode 143, that is to say practically in a short circuit, and the safety device (not shown) of the circuit of FIG. 2 makes the transistor 114 conductive via, preferably, a photocoupler (not shown) resulting in the blocking of the phototransistor 22. However, there is the danger of thus destroying a part of the circuit of FIG. 2, in particular the diode 143, by the energy supplied by the armature whose time constant is greater than that of the coil 135, which cannot absorb all this energy. It is therefore preferable to engage the forward travel when the speed of the vehicle is zero, possibly providing a suitable circuit which prevents control of forward travel as long as the speed of rotation of the motor is not zero.

Moreover, in order to avoid, in reverse operation upon release of the accelerator, oscillations in the relay which is controlled by the excitation coil 54 upon the detection of the cancellation of the armature current by the amplifier 38, suitable means are provided (not shown), controlled by the switch 50, which eliminate this effect, said means being, for instance, connected in parallel to the excitation coil 54.

The preferred embodiment of the invention described with reference to FIG. 1 comprises photocouplers, but one could of course replace all or part of these photocouplers by equivalent electronic circuits. The advantage of couplers it that they make it possible to separate potentials and assure a simple, progressive control.

It is therefore seen that the process of the present invention makes it possible to adapt the characteristics of the DC motor, preferably with separate excitation, to the different loads imposed at all speeds of rotation, by means of a continuous combined electronic regulation of the armature and field currents. One can also adapt the characteristics of the same motor, used as generator, to the different resistant torques with energy recovery and this, at all speeds of rotation, also by means of the device for the electronic regulation of the field and armature currents. This regulation employs the cutout technique, known per se.

This regulation is obtained by means of photocouplers whose emitters are placed in side branches and the diagonal of a bridge connected between the output of a control amplifier and the output of an amplifier whose voltage is proportional to the armature current. Due to different shuntings of the emitters of the photocouplers, one obtains a sequential control of the couplers, the action of one of these photocouplers starting only when the action of the other is practically terminated, this control takes place, however, continuously and the placing in or out of operation of the emitters of the photocouplers taking place progressively. In addition to the bridge containing the emitters of the photocouplers, one essential arrangement of the present invention is that which permits the switching of the armature current chopper from the amplifier comprising the transistors 122, 127 and 129 to the amplifier comprising the transistors 138 and 140 upon detection of the passage through zero of the armature current in the energy recovery mode.

The advantage of the arrangement of the present invention resides also in the fact that the control of the motor is effected with low current; as from a given speed of rotation of the motor, corresponding to saturation of the field winding, the speed of the vehicle being at this moment on the order of 30 km/hour in one embodiment, one acts only on the excitation current.

Furthermore, the circuit of the present invention makes it possible to include, in particular due to the use of photocouplers, various safeties which operate both in the traction mode and in the energy recovery mode, these safeties operating progressively and all acting on a single control photocoupler detector arranged in the diagonal of the bridge. This single detector makes it possible to limit the armature current in critical cases of operation such as over-voltage or under-voltage of the battery, starting of the vehicle, excessive heating of the motor, overspeed of the motor and over-amperage in a power circuit.

It will finally be noted that, by means of a control circuit centralized in a bridge, one effects the control of the motor as a function of three parameters, namely field current, armature current, and speed of rotation of the motor.

Although the invention has been described with reference to a particular embodiment, it will be apparent that various modifications can be made therein without departing from the spirit and scope of the invention. Accordingly, the invention is not to be considered as limited by this described embodiment, but only by the appended claims.

What is claimed is:

1. An apparatus for controlling a DC motor having an armature coil and a field coil and used for the propulsion and the energy recovery braking of a motor vehicle, said apparatus comprising
   an armature current chopper having a signal input and an output connected to said armature coil;
   a separate filed current chopper having first and second signal inputs and an output connected to said field coil;
   means for providing an armature current control signal;
   a plurality of safety devices;
   means for providing a control voltage proportional to requested power with a positive value when an acceleration is selected and a negative value when a braking is selected; and, control means for controlling both said armature current and said field current for obtaining a selected acceleration and braking comprising:
a first controlled means responsive to the output of a first control signal emitting means for providing a control signal to said first signal input of said field current chopper,
a second controlled means responsive to the output of a second control signal emitting means for providing a control signal to said second signal input of said field current chopper,
a third controlled means responsive to the output of a third control signal emitting means for providing a control signal to said signal input of said armature current chopper,
a fourth controlled means responsive to the output of a fourth control signal emitting means for progressively limiting armature current, said fourth control signal emitting means being controlled by said plurality of safety devices; and,
a bridge circuit comprising a first, second, third and fourth terminals, a first outer arm connected between said first and second terminals and including said first control signal emitting means and in parallel therewith an electrical circuit including a resistor, a second outer arm connected between said second and third terminals and including said second control signal emitting means, a third and fourth outer arms respectively connected between said fourth terminal and said first and third terminals, said third and fourth arms each including a diode, an inner diagonal arm connected between said second and fourth terminals and including a serial connection of said third control signal emitting means and said fourth controlled means, said first terminal being connected to the output of said means for providing a control voltage proportional to requested power and said third terminal being connected to the output of said means for providing an armature current control signal.

2. An apparatus as in claim 1 wherein each of said first, second, third and fourth controlled means is a light receptor and each of said first, second, third and fourth control signal emitting means is a light emitter, each said light receptor and associated light emitter being constructed as a photocoupler.

3. An apparatus as in claim 2 wherein each of said light emitters is a light emitting diode, and each of said light receptors is a phototransistor.

4. An apparatus as in claim 3 wherein the phototransistor forming the fourth controlled means is normally conductive and its conductivity is decreased by a reduction in light output of the light emitting diode forming said fourth control signal emitting means caused by operation of said plurality of safety devices.

5. An apparatus as in claim 4 wherein said plurality of safety devices detect excessive conditions in at least one of the following variables: armature current, speed of the motor, over-voltage of the battery supplying the motor, under-voltage of said battery, or temperature of the motor, said plurality of safety devices being coupled via said fourth control signal emitting means and fourth controlled means to said bridge circuit.

6. An apparatus as in claim 2 wherein said motor selectively operates in a traction mode or an energy recovery mode and in which said armature current chopper output is connected, in a traction mode, to a first amplifier for control of the armature current, and, in energy recovery mode, to a second amplifier for control of the armature current.

7. An apparatus as in claim 6 further comprising a means for detecting the passage through zero of the armature current and for controlling the switching of said armature current chopper output to one of said amplifiers.

8. An apparatus as in claim 6 or 7 wherein said armature current chopper comprises a comparator, one of the inputs of which is connected to a triangular voltage generator of fixed recurrent frequency, and the other input of which is coupled to said control means.

9. An apparatus as in claim 1 in which said field current chopper produces substantially rectangular signals of variable frequency of recurrence and constant time of conduction, the output of said field chopper being coupled to the field winding of said motor, said field current chopper being controlled by said first and second controlled means.

10. An apparatus as in claim 6 wherein one of said amplifiers includes at least two transistors, one transistor being fed by battery supplying said motor and the other transistor being fed by a voltage greater than the battery voltage.

11. An apparatus as in claim 1 wherein said means for providing an armature current control signal includes an amplifier supplying to the third terminal of said bridge a signal which is a function of the armature current, one of the inputs of said amplifier being connected to a negative feedback circuit containing a thermistor arranged on a frame of said motor and connected in such a manner as to increase the gain of said amplifier when the temperature of said motor increases.

12. An apparatus as in claim 3 further comprising means for sensing the speed of rotation of said motor and for providing a speed control signal proportional to said speed of rotation, said speed control signal being combined with said control voltage proportional to requested power and processed together therewith by said bridge circuit.

* * * * *